Jan. 10, 1928.

G. H. JOHANSON ET AL 1,655,815

CONTROL MECHANISM

Filed March 25, 1926

Gustav H. Johanson
Christian Wilhjelm
Inventors
By their Attorney
Ivan E. A. Konigsberg

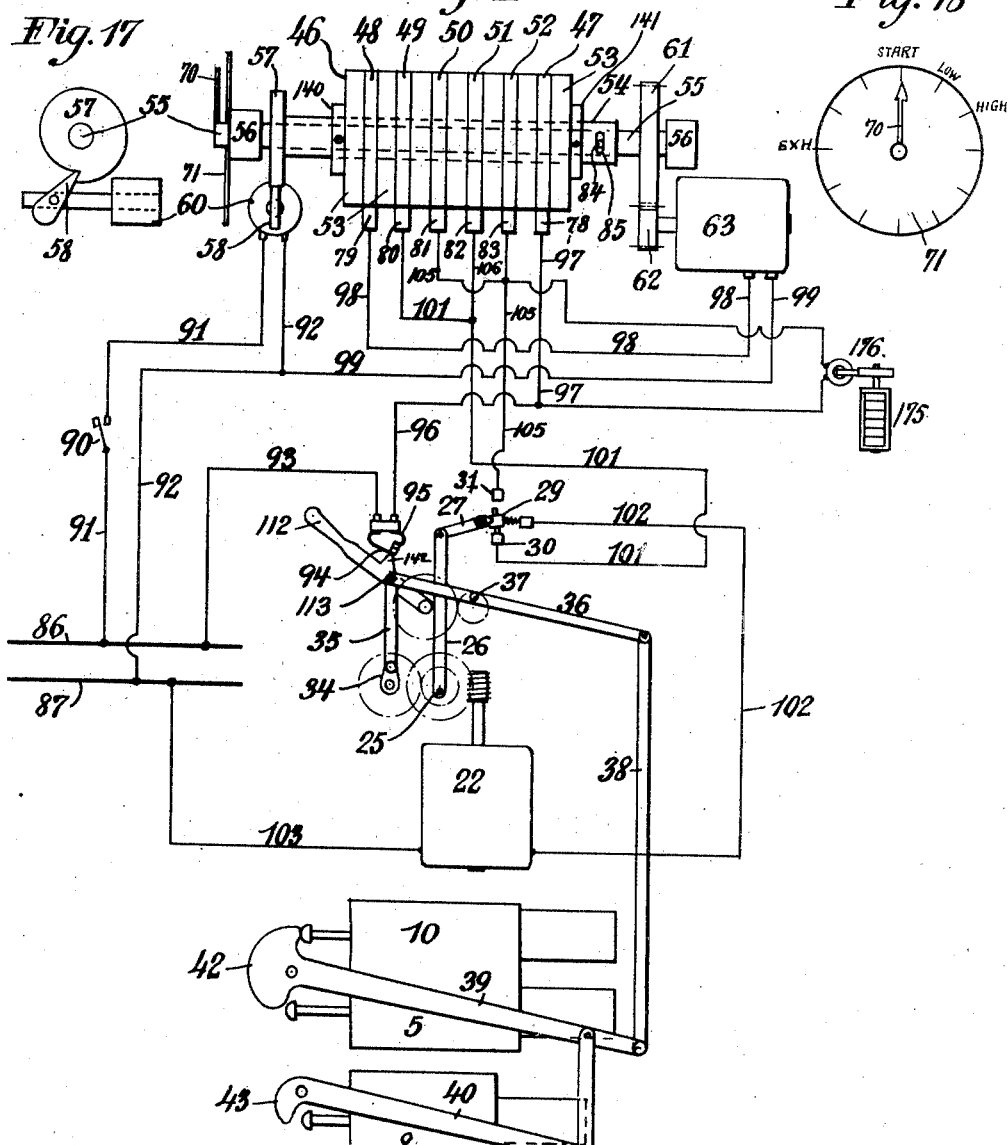
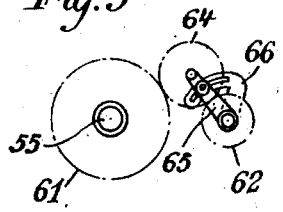

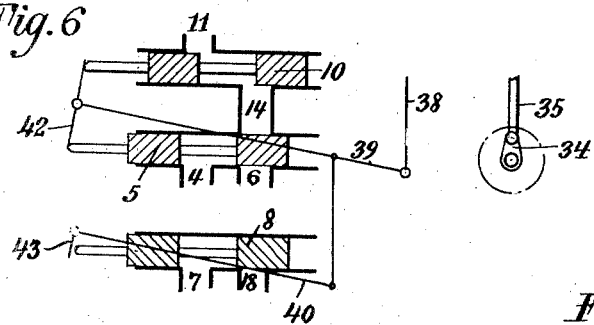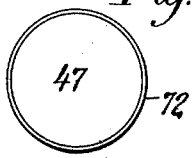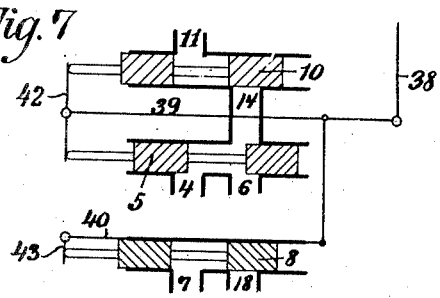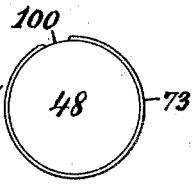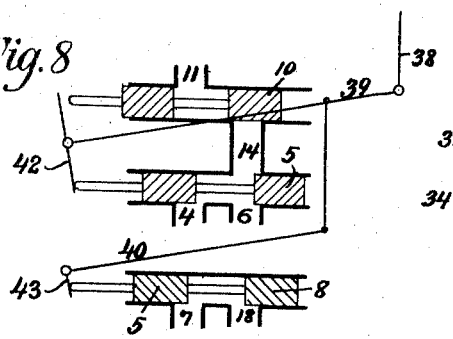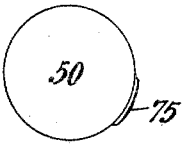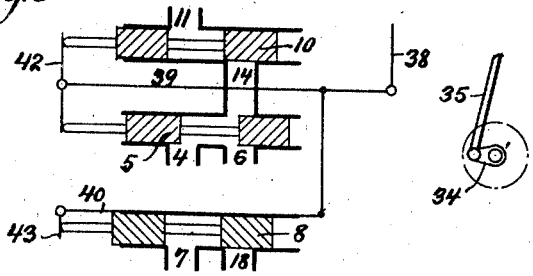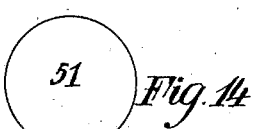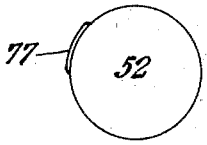

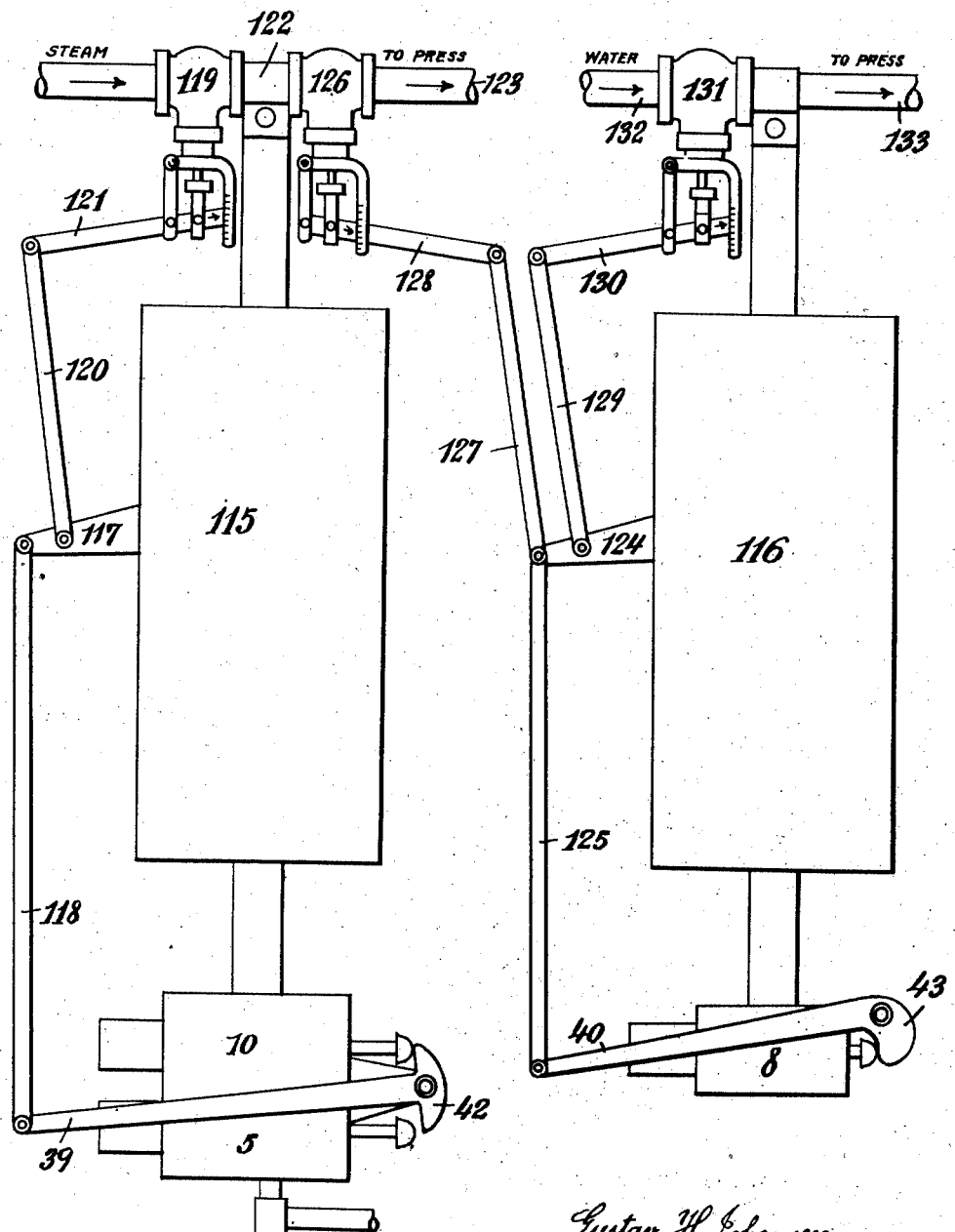

Patented Jan. 10, 1928.

1,655,815

UNITED STATES PATENT OFFICE.

GUSTAV H. JOHANSON AND CHRISTIAN WILHJELM, OF PHILADELPHIA, PENNSYLVANIA.

CONTROL MECHANISM.

Application filed March 25, 1926. Serial No. 97,192.

This invention relates to improvements in mechanisms for controlling hydraulic or other pressures.

The invention is embodied in a mechanism comprising means for opening and closing valves in a hydraulic pressure system and timing means for controlling the periods during which the valves remain open or closed to apply or cut off the pressure. Means are also provided for indicating the operation of the valve operating mechanism, and devices are provided for momentarily interrupting the cycle of operations and again continuing the same. The invention is also adapted for the control of the application of heat or cold, or both, at stated intervals.

Specifically, the invention is disclosed in connection with the operation of a hydraulic press performing work or operations which require the display or functioning of all of the several submechanisms and features of the invention.

In this instance it is assumed that the press ram is to be operated against the die bed under a certain lesser pressure which is to be applied for a given length of time, and that thereafter a certain greater pressure is to be applied against the ram for another, different, length of time. Also it is assumed that the work requires a momentary interruption of the cycle of operations in such a manner that it may be continued from the point at which it was interrupted, and means are disclosed for performing heating and cooling operations.

The object of the invention is to provide an electrically operated automatic control apparatus embodying features adapted to function or perform in accordance with the conditions or requirements set forth in the foregoing.

The invention will be better understood from the following specification read in connection with the accompanying drawings in which Figure 1 is a front elevation of a hydraulic press equipped with a control apparatus embodying the invention.

Figure 4 is a diagrammatic view illustrating the operation of the invention.

Figure 5 is a diagrammatic view of a speed changing mechanism.

Figures 6 to 9 are diagrammatic views showing the operations of the valves and the corresponding positions of the valve operating crank.

Figures 10 to 15 are views of the contacting timing cams or segments.

Figure 16 shows the invention used for the purpose of controlling a heating and cooling system.

Figure 17 is a detail view of a starting device.

Figure 18 is a view of the indicating dial.

Figure 1:
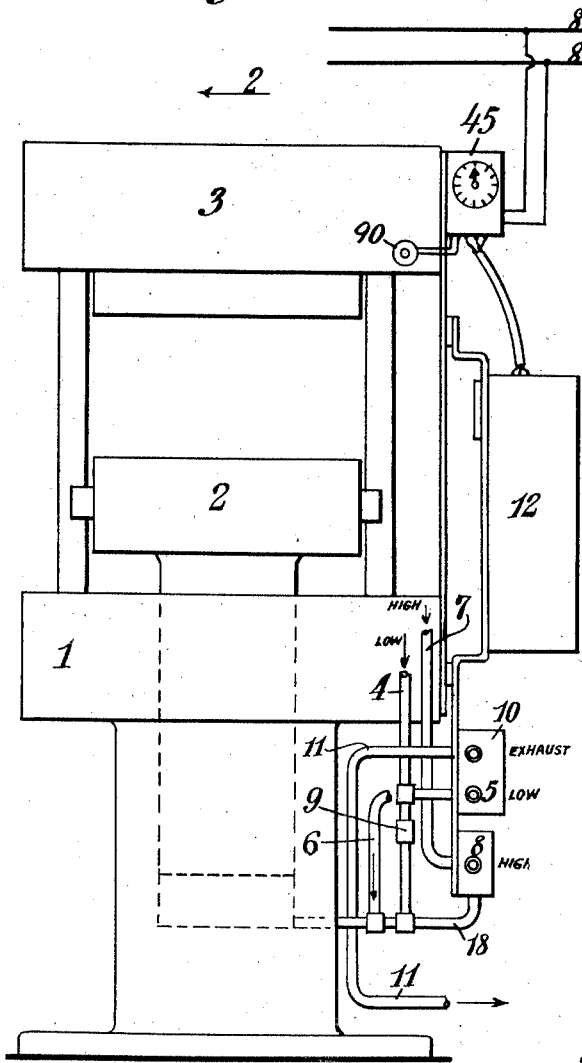
Figure 2:
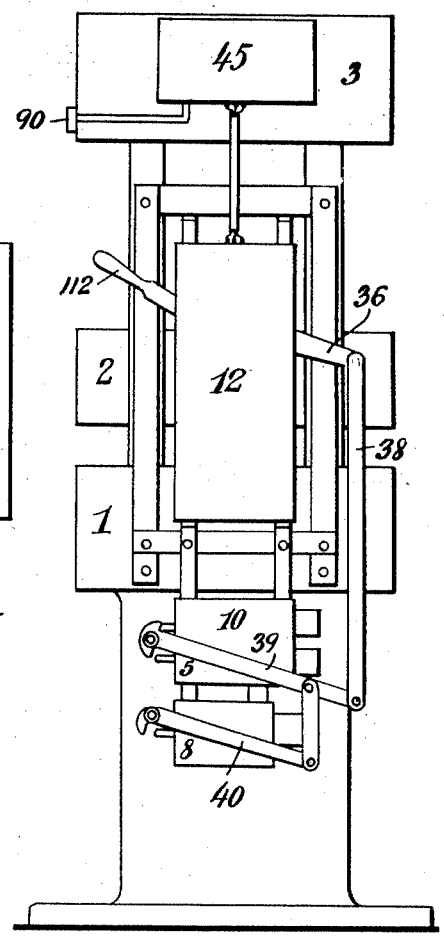
Figure 2 is a view of the press looking in direction of arrow 2 in Figure 1.

Referring to Figures 1 and 2, the reference numeral 1 denotes a hydraulic press having a vertially movable ram 2 working against a bed 3. In order to fully disclose the features of the invention, it is assumed that the press is used for the pressing of articles of phenolic condensation product, such for instance as are used in the radio industry. In such a case it is required that the ram be moved upward under a certain low pressure applied both during and after the movement, and that thereafter a certain high pressure is to be applied to the ram while in its upper working or pressing position. It is also assumed that during the operations of the press, the ram shall be moved down temporarily, for the purpose for instance of permitting the escape of gases. Finally it is assumed that at certain stages of the work, the ram or bed requires heating and cooling in order to properly press or form the work.

Figure 3:
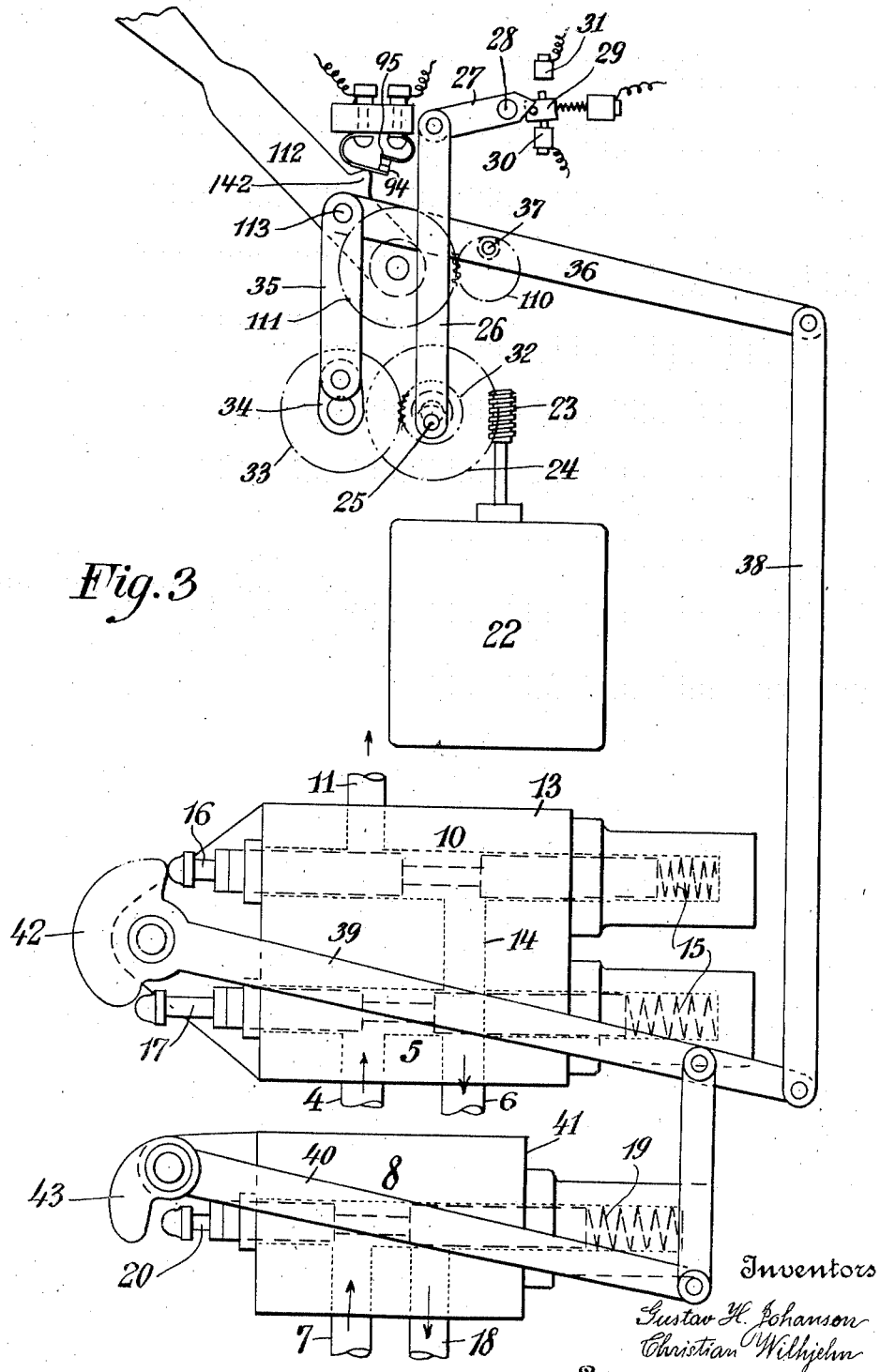
Figure 3 is a view, partly diagrammatic of the valves and the valve operating mechanism.

The water at low pressure is admitted to the press through the low pressure supply pipe 4 to the low pressure valve 5 and from the latter the water passes to the press through another pipe 6. The pipe 6 has a horizontal branch leading from the valve 5 in front of the horizontal branch of the pipe 4. The horizontal branch of pipe 6 is broken away in Figure 6, but is shown in Figure 3. The water under high pressure is admitted through the high pressure pipe 7, through high pressure valve 8 and thence to the press through pipe 18. 9 is a check valve which operates to prevent the high pressure from backing into the low pressure pipe when the high pressure is on. 10 is the exhaust valve which controls the exhaust pipe line 11. The numeral 12 denotes a valve control box which contains the valve controlling mechanism.

Referring now to Figure 3, it will be seen that the exhaust valve 10 and the low pressure valve 5 are contained within a single housing 13 having a bore or channel 14 leading from the one valve to the other. The valves are urged towards closed positions by suitable springs 15, and are further provided with operating stems 16 and 17. The high pressure valve 8 controls the communication between high pressure inlet and outlet 7 and 18, respectively. The valve is normally closed by a spring 19 and has an operating stem 20. The valves are of a well known type used on hydraulic presses.

The valve operating mechanism comprises a valve operating motor 22 which through suitable reducing gearing 23—24 rotates a crank pin 25 connected by a link 26 to a snap switch lever 27 pivoted at 28. Lever 27 actuates a movable conducting contact member 29 adapted to contact with fixed contacts 30 and 31.

The crank pin 25 is carried by a gear 32 on the same shaft as the gear 24 and which drives another gear 33 provided with a valve operating crank 34 which actuates a link 35 connected to the valve operating lever 36 which is pivoted on a floating pivot 37. A link 38 connects the valve operating lever 36 with the interconnected valve arms 39 and 40 pivoted on the valve housings 13 and 41 and provided with valve operating cams 42 and 43. From the foregoing it will be clear that when the motor 22 is operated, the valve operating lever 36 will be moved into different positions to actuate the valve arms 39 and 40 to operate the valves. This will appear more in detail hereinafter.

The valve operating motor 22 is timed by a timing mechanism contained within a time control box 45, Figures 1 and 2, and illustrated diagrammatically in Figure 4 in which the reference numeral 46 denotes a timing drum having six conducting cams numbered 47, 48, 49, 50, 51 and 52 separated by non-conducting disks 53, 53. The cams and disks are carried by a conducting sleeve 54 mounted on a shaft 55 mounted in suitable bearings 56, 56. The cams and disks are adjustably clamped on the sleeve between suitable collars 140 and 141 to rotate with the shaft. To one end of the sleeve 54 there is secured a starting disk 57 actuated by a pawl 58 which is operated to rotate the disk 57 by means of a solenoid 60. At the opposite end the shaft 55 carries a gear 61 driven from the gear 62 on the timing motor 63.

Figure 5 illustrates a speed changing device in which an idler gear 64 is mounted on an arm 65 which may be adjusted circumferentially of the motor gear 62 in a fixed slotted member 66. It is obvious that the idler gear 64 drives the timing drum gear 61 at a given ratio or speed with relation to the motor gear 62, in that the idler gear is adjusted to mesh with both the gears 61 and 62. Thus the speed of the timing drum may be changed by substituting differently sized gears on the timing shaft 55. On the latter there is also mounted a hand 70 moving over a fixed dial 71.

The conducting cams have contacting portions 72, 73, 74, 75, 76 and 77 as seen in Figures 10 to 15. The contacting cams make contact with fixed yielding contacts 78, 79, 80, 81, 82 and 83. The shaft 55 carries a pin 84 which plays in a slot 85 in the drum sleeve 54. 86 and 87 are the line wires.

The operation is as follows: The operator, in the case chosen for illustration, fills the dies with phenolic condensation product powder and places the filled dies on the ram. He then presses the push button 90 thus closing a circuit through the starter solenoid 60 through wires 91 and 92. The solenoid being energized moves the pawl 58 to rotate the starter disk 57 and drum 46 a short distance during which time the slot 85 in the sleeve 54 moves on the pin 84, there being a short lost motion between the sleeve and the shaft 55. This starting rotating movement of the drum is sufficient to establish contact between the interrupted cam contact 73 on disk 48, Figure 11, and its fixed contact 79, Figure 4, so that a circuit is established as follows:—from line 86 via wire 93, closed spring contacts 94, 95, wire 96, wire 97, cam contact 72, Figure 10, to sleeve 54, through the sleeve to conducting disk 48 and its contacting cam 73, contact 79, wire 98, motor 63 and wires 99 and 92 back to the line 87. Hence the timing motor 63 starts to rotate and keeps rotating to drive the timing drum one complete revolution at the end of which the circuit through the motor is broken by the gap 100 in conducting cam 73, Figure 11. This gap corresponds in length substantially to the length of the lost motion between the drum shaft 54 and drum sleeve 55.

Immediately after the start of the timing motor 63, the cam contact 74, Figure 12, contacts with fixed contact 80 and a circuit is established as follows:—from line 86 through 93, 94, 95, 96, 97, 78, the drum to contact 80 and wire 101 to switch contact 30, to 29 and wire 102 to the valve operating motor 22, hence through wire 103 back to the line 87. This second circuit starts the valve operating motor 22 and through the instrumentalities described in connection with Figure 3, the crank 34 is rotated one quarter turn from the position shown in Figures 3, 4 and 6 to the position shown in Figure 7.

Consequently the valve operating lever 36 has been actuated to operate the valve arms and valves 10 and 5 into the position shown in Figure 7 with the result that the exhaust valve 10 has been permitted to close (by its spring 15) and the low pressure valve 5 has been opened by valve cam 42. Water under low pressure is therefore admitted to lift the ram up against the die bed 2.

However, the circuit through the valve operating motor 22 is broken as soon as the crank 34 has been operated at first quarter turn, because simultaneously with the operation of said crank, the crank pin 25 has been rotated one half revolution and broken the circuit by operating the switch lever 27 to break the contacts 30 and 29, and the contact 29 snaps to the other side and makes contact with 31. Hence the motor 22 stops and the low pressure remains on until a new circuit is established through the motor 22 by way of the timing drum.

The new circuit is closed when the cam contact 75, Figure 13, contacts with fixed contact 81. The circuit is as follows:—from the line 86 and to the drum disk 47 as described above, then to disk 50, contacts 75 and 81, thence through wire 105 to switch contacts 31 and 29 and thence through the motor 22.

The crank 34 is operated a second quarter turn to the position shown in Figure 8 and correspondingly the valve arms and valves have been moved their full stroke as shown in Figure 8 and valve cam 43 has opened the high pressure valve 8 through which water at high pressure is admitted to the press and under the ram thereby subjecting the phenolic condensation product to an increased high pressure.

The check valve 9, Figure 1, prevents the high pressure from entering the low pressure line in an obvious manner.

However, the circuit through the motor 22 has again been broken at 29—31 at the switch and contact again made at 29—30. The high pressure will therefore remain on until the motor 22 is again started. This starting occurs when the cam contact 76, Figure 14, comes around and contacts with fixed contact 82, whereby a new circuit is established from the line 86 to the drum as before, thence to disk 51, contact 82 and wires 106 and 101, through the switch 30—29 and through motor 22 and back to the line.

The motor 22 starts for the third time and crank 34 is moved into the position shown in Figure 9 and the valve arms are likewise operated so that the high pressure valve is closed. Immediately thereafter, the circuit is again broken at the switch and the last cam contact 77, Figure 15, contacts with fixed contact 83, Figure 4, to establish a circuit through motor 22 by way of wires 105 and 102, and the crank 34 is moved from the last stated position in Figure 9 to the normal position in Figure 6. The valves are accordingly again operated to close the low pressure and open the exhaust, and the press is opened and the pressed articles taken out. The cycle of operations is now completed.

From the foregoing it will be clear that from the moment the operator pushes the button 90 the cycle of operations begin automatically and is completed, each operation being timed exactly in accordance with the cam contacts on the timing drum. These contacts are inexpensive to make and adjustably attached to the drum and thus the timing may be varied quickly to correspond with the requirements of the work.

It has been proposed to time the valves by means of cams of different length operating directly on the valve stems, and theoretically this would seem entirely feasible and practicable. However, in practice it has been found well nigh impossible to make cams so accurate as to time the operations to the degree required and which very often must be done to the second to avoid unfavorable chemical changes in the product. It is also very expensive because only the highest skilled labor may be employed and it is impossible to make the cam arrangement as flexible as the adjustment of the contact disks on the timing drum.

It has been stated in the foregoing that the cycle of operations must be interrupted at times, for instance to permit the escape of gases. To accomplish this, an emergency mechanism is provided. Referring to Figures 3 and 4 it will be seen that the floating pivot 37 for the valve operating lever 36 is carried by a gear 110 which meshes with another gear 111 operated by an emergency handle 112, which also keeps the spring contacts 94 and 95 normally closed by an abutment 142.

When it is desired to open the press at any time because of some trouble, with the dies for instance, the operator pulls down on the handle 112, and thus interrupting the circuit at 94 and 95, rotates the lever pivot 37 one half revolution on gear 110 and the pin 113 between the link 35 and lever 36 now becomes the pivot around which lever 36 is moved.

If the emergency handle is thus pulled while the low pressure is on, see Figure 7, it is clear that the lever 36 is operated to move the valve arms into the normal position in Figure 6 and the press may be opened to remedy the trouble. Similarly if the trouble occurs while the high pressure is on, Figure 8, and the handle 112 is operated, the valves will be moved back to the position in Figure 7 when low pressure is on, and by thereafter closing (lifting) the emergency handle, the valves will be restored to normal position and the press may be opened.

If the press is to be opened merely to let off gases, the operator pulls the handle 112 down and then up again and almost at once to permit the ram to lower just enough to let the gases escape. After the operation of the emergency handle, the cycle of the operations proceed as before, the circuit being restored automatically by the closing of contacts 94 and 95.

Referring now to Figure 16 the numerals 115 and 116 denote two valve boxes or valve operating mechanisms similar to the one marked 12 in Figure 1 and described above. A valve operating lever 117, similar to the above described lever 36, extends from box 115 and is connected to the valve arm 39 for the exhaust and low pressure valves by a link 118, and is connected to operate a steam valve 119 through steam pipe 122 to the press at 123.

A similar valve operating lever 124 extends from valve box 116 and is connected to the high pressure valve arm 40 by a link 125. To the other side it is connected to operate another valve 126 in the steam line 122 by means of links 127 and 128. The lever 124 is also connected by links 129 and 130 to operate a valve 131 in the water pipe line 132 leading to the press at 133.

The operation is as follows. When the lever 117 is moved (through the timing drum circuit) to open the low pressure valve 5 through the link 118, it also through links 120 and 121 opens the steam valve 119 to admit steam to the press (dies). At this time valve 126 is open because the other valve box 116 has not yet been operated. When thereafter, as per the above described timing drum circuits, the lever 124 through link 125 opens the high pressure valve 8, it also closes valve 126 through links 127 and 128, thereby shutting off the steam to the press. And at the same time, through links 129 and 130, the water valve 131 is opened to admit cooling water through the water pipe line 132. When the cycle of operation is completed the valves 119 and 131 will be closed and the valve 126 opened ready for the next operation.

The wiring diagram from the drum to the two valve boxes is not shown, it being obvious from the disclosure in Figure 4.

The several steps in the cycle of operations may be conveniently observed by the passage of the hand 70 moving over the dial 71. On the latter may be placed suitable legends indicating the several steps so that the operator may at all times know and observe the progress of the work. An illustration of the markings on the dial is shown in Figure 18.

The volume of operations may be observed by means of a Veeder counter 175 which is operated stepwise by a suitable mechanism indicated at 176 and which may be of a nature similar to that seen in Figure 17.

The foregoing is thought to clearly disclose our invention and its several features. The apparatus as a whole may be attached directly to the press or erected at some distance therefrom. The exact length of time of each individual operation is measured by the length of the contacting cam surfaces on the timing drum. Any variation therein is quickly made by loosening the collars 140 and 141 on the timing drum sleeve and then adjust the contact cams circumferentially thereof. It will also be understood that the number and shapes of the contacting cams and the number of circuits established thereby may be considerably varied, the apparatus being extremely flexible and adapted to suit varying local conditions.

While we have shown our invention in its preferred form nevertheless it will be understood that we do not wish to be limited to the exact features or details shown, but that changes and alterations may readily be made without departing from the principle of the invention and within the scope of the appended claims.

We claim:—

1. In a system for controlling hydraulic pressures, the combination of pressure supply means, valves for regulating the pressures, valve actuating means, automatic mechanism for operating the valve actuating means to regulate the valves in predetermined sequence, and an electric circuit for automatically actuating said mechanism.

2. In a system for controlling hydraulic pressures, the combination of means for supplying pressures of different degrees, valves for regulating the pressures, a control apparatus for automatically operating the said valves in predetermined sequence and at different periods corresponding to the pressures to be applied, and an electric circuit for automatically actuating said control apparatus.

3. In a system for controlling hydraulic pressures, the combination of pressure supply means and an automatic electrically operated control mechanism for regulating the degrees and durations of the pressures applied.

4. In a system for controlling hydraulic pressures, the combination of pressure supply means and an automatic electrically operated control mechanism for regulating the degrees and durations of the pressures applied in predetermined sequence.

5. In a system for controlling hydraulic pressures, the combination of pressure supply means, pressure regulating means, mechanism for operating the regulating means and an electric circuit for actuating said mechanism to operate the regulating means automatically through a predetermined cycle of operations applying the pressures in different degrees and for different periods of durations.

6. In a system for controlling hydraulic pressures, the combination of pressure supply means, pressure regulating means, mechanism for operating the regulating means and an electric circuit for actuating said mechanism to operate the regulating means automatically through a predetermined cycle of operations applying the pressures in different degrees and for different periods of durations and means for rendering said actuating circuit inoperative upon the completion of the said cycle of operations.

7. In a system for controlling hydraulic pressures, the combination of pressure supply means, pressure regulating means, mechanism for operating the regulating means, an electric circuit for actuating said mechanism to operate the regulating means automatically through a predetermined cycle of operations applying the pressures in different degrees and for different periods of duration and means for breaking the said electric circuit to momentarily interrupt the operations of the said mechanism.

8. In a system for controlling hydraulic pressures, the combination of pressure supply means, pressure regulating means, mechanism for operating the regulating means, an automatically actuated electrically operated apparatus for actuating said mechanism to operate the regulating means automatically through a predetermined cycle of operations applying the pressures in different degrees and for different periods of duration, means for stopping the operations of said apparatus to interrupt the said cycle of operations and for again causing said apparatus to operate to resume and continue the operations of the said cycle of operations.

9. In a system for controlling hydraulic pressures, and the application of heat and cold, the combination of pressure supply means and means for supplying heat and cold, automatic means for applying heat together with pressure of a predetermined degree, said application to last for a predetermined period of duration, and other automatic means for applying cold together with a different pressure, said second application to last for the same or a different period of duration.

10. In a system for controlling hydraulic pressures and the application of heat and cold, the combination of pressure supply means and means for supplying heat and cold, devices for regulating the said supplying means, mechanisms for operating the regulating devices and electrically operated automatic control apparatus for actuating said mechanisms to operate the regulating devices automatically through a predetermined cycle of operations for applying pressure at a given degree together with applying heat and for applying pressure at another given degree together with applying cold.

11. In a system for controlling hydraulic pressures and the application of heat and cold simultaneously therewith in a predetermined sequence, the combination of apparatus for supplying pressure and heat and cold, devices for regulating the said supplying apparatus, mechanisms for operating the regulating devices, an electrically operated automatic control instrument for actuating some of said mechanisms to operate some of the regulating devices through a predetermined cycle of operations applying a given pressure and heat for a given length of time and a second similar electrically operated automatic control instrument for actuating other mechanisms to operate other regulating devices through another predetermined cycle of operations applying a different pressure and cold for a given length of time and for shutting off the application of heat.

12. In a system for controlling hydraulic pressures, the combination of pressure supply means, pressure regulating means, mechanism for operating the regulating means and an electric circuit for actuating said mechanism to operate the regulating means automatically through a predetermined cycle of operations applying the pressures in different degrees and for different periods of durations and means indicating the said cycle of operations.

GUSTAV H. JOHANSON.
CHRISTIAN WILHJELM.